(12) United States Patent
McGuire, Jr.

(10) Patent No.: US 9,466,335 B2
(45) Date of Patent: Oct. 11, 2016

(54) HERMETIC HARD DISK DRIVES COMPRISING INTEGRALLY MOLDED FILTERS AND RELATED METHODS

(75) Inventor: James E. McGuire, Jr., Westerville, OH (US)

(73) Assignee: entrotech, inc., Columbus, OH (US)

( * ) Notice: Subject to any disclaimer, the term of this patent is extended or adjusted under 35 U.S.C. 154(b) by 545 days.

(21) Appl. No.: 13/096,685

(22) Filed: Apr. 28, 2011

(65) Prior Publication Data
US 2012/0275053 A1    Nov. 1, 2012

(51) Int. Cl.
*G11B 33/14*    (2006.01)
*G11B 25/04*    (2006.01)

(52) U.S. Cl.
CPC ............ *G11B 33/14* (2013.01); *G11B 25/043* (2013.01); *G11B 33/146* (2013.01); *G11B 33/1446* (2013.01); *Y10T 29/4998* (2015.01)

(58) Field of Classification Search
USPC .......... 360/97.01–97.02, 97.12–97.13, 97.16
See application file for complete search history.

(56) References Cited

U.S. PATENT DOCUMENTS

| | | |
|---|---|---|
| 3,596,828 A | 8/1971 | Foster et al. |
| 4,058,632 A | 11/1977 | Evans et al. |
| 4,096,309 A | 6/1978 | Stillman |
| 4,284,672 A | 8/1981 | Stillman |
| 4,306,259 A | 12/1981 | Saito et al. |
| 4,367,503 A | 1/1983 | Treseder |
| 4,642,715 A | 2/1987 | Ende |
| 4,662,521 A | 5/1987 | Moretti |
| 4,686,592 A | 8/1987 | Carroll et al. |
| 4,795,907 A | 1/1989 | Maekawa et al. |
| 4,855,849 A | 8/1989 | Jones et al. |
| 4,965,691 A | 10/1990 | Iftikar et al. |
| 5,025,335 A | 6/1991 | Stefansky |
| 5,147,086 A | 9/1992 | Fujikawa et al. |
| 5,150,267 A | 9/1992 | Reinisch |
| 5,157,831 A | 10/1992 | Wang et al. |
| 5,175,657 A | 12/1992 | Iftikar et al. |
| 5,214,550 A | 5/1993 | Chan |
| 5,233,491 A * | 8/1993 | Kadonaga et al. ........ 360/97.02 |
| 5,235,481 A | 8/1993 | Kamo et al. |

(Continued)

FOREIGN PATENT DOCUMENTS

| | | |
|---|---|---|
| EP | 0 546 680 | 6/1993 |
| JP | 06-008947 | 1/1994 |

(Continued)

OTHER PUBLICATIONS

"Donaldson Filtration Systems Adsorbent Label Filter (ALF): Disk Drive," Donaldson Company, Inc., Minneapolis, MN (Jul. 31, 2010).
"Donaldson Filtration Systems Adsorbent Pouch Filter (APF): Disk Drive," Donaldson Company, Inc., Minneapolis, MN (Jul. 31, 2010).
"Infrared," http://en.wikipedia.org/wiki/Infrared (Feb. 14, 2011).
"Laser Makes Invisible Welds in Plastics," *Connect*, No. 100; http://www.twi.co.uk/content/c1008b.html (May 31, 1999).

(Continued)

*Primary Examiner* — Carlos E Garcia
(74) *Attorney, Agent, or Firm* — The Griffith Law Firm, A P.C.; Lisa M. Griffith

(57) ABSTRACT

A hermetic hard disk drive of the invention comprises: a housing comprising a base and a cover, wherein at least one of the base and the cover comprises a moldable material; at least one disk for storage of data within the housing; an actuator for reading and recording of the data on the at least one disk; and a filter comprising an integrally molded filter frame within the moldable material of the housing of the hard disk drive. Methods of forming such hard disk drives are also disclosed.

22 Claims, 6 Drawing Sheets

(56) References Cited

U.S. PATENT DOCUMENTS

| | | | |
|---|---|---|---|
| 5,243,495 A | 9/1993 | Read et al. | |
| 5,247,410 A | 9/1993 | Ebihara et al. | |
| 5,253,129 A | 10/1993 | Blackborow et al. | |
| 5,270,887 A | 12/1993 | Edwards et al. | |
| 5,282,099 A | 1/1994 | Kawagoe et al. | |
| 5,317,463 A | 5/1994 | Lemke et al. | |
| 5,376,424 A | 12/1994 | Watanabe | |
| 5,454,157 A | 10/1995 | Ananth et al. | |
| 5,536,917 A | 7/1996 | Suppelsa et al. | |
| 5,559,650 A | 9/1996 | Repphun et al. | |
| 5,587,854 A | 12/1996 | Sato et al. | |
| 5,587,855 A | 12/1996 | Kim | |
| 5,608,592 A | 3/1997 | Mizoshita et al. | |
| 5,703,735 A | 12/1997 | Bleeke | |
| 5,722,538 A | 3/1998 | Neely et al. | |
| 5,732,063 A | 3/1998 | Chen | |
| 5,751,514 A | 5/1998 | Hyde et al. | |
| 5,781,373 A | 7/1998 | Larson et al. | |
| 5,837,934 A | 11/1998 | Valavanis et al. | |
| 5,880,904 A | 3/1999 | Mizoshita et al. | |
| 5,898,537 A * | 4/1999 | Oizumi et al. | 360/99.18 |
| 5,969,901 A | 10/1999 | Eckberg et al. | |
| 6,008,965 A * | 12/1999 | Izumi et al. | 360/97.16 |
| 6,023,392 A | 2/2000 | Kim | |
| 6,108,164 A | 8/2000 | Weber | |
| 6,129,579 A | 10/2000 | Cox et al. | |
| 6,168,459 B1 | 1/2001 | Cox et al. | |
| 6,181,530 B1 | 1/2001 | Ratliff et al. | |
| 6,226,143 B1 * | 5/2001 | Stefanksy | 360/99.2 |
| 6,236,532 B1 | 5/2001 | Yanagisawa | |
| 6,243,262 B1 | 6/2001 | Koo et al. | |
| 6,258,432 B1 | 7/2001 | Terada et al. | |
| 6,317,286 B1 | 11/2001 | Murphy et al. | |
| 6,339,521 B1 * | 1/2002 | Durrum et al. | 360/256.1 |
| 6,392,838 B1 | 5/2002 | Hearn et al. | |
| 6,397,932 B1 | 6/2002 | Calaman et al. | |
| 6,407,659 B2 | 6/2002 | Mochida et al. | |
| 6,430,000 B1 * | 8/2002 | Rent | 360/99.25 |
| 6,438,685 B1 | 8/2002 | Brower et al. | |
| 6,442,021 B1 | 8/2002 | Bolognia et al. | |
| 6,469,864 B2 * | 10/2002 | Kamezawa et al. | 360/97.01 |
| 6,473,264 B2 * | 10/2002 | Bae et al. | 360/97.16 |
| 6,480,353 B1 | 11/2002 | Sacks et al. | |
| 6,525,899 B2 | 2/2003 | Hearn et al. | |
| 6,560,064 B1 | 5/2003 | Hirano | |
| 6,570,736 B2 | 5/2003 | Noda | |
| 6,639,757 B2 | 10/2003 | Morley et al. | |
| 6,646,821 B2 | 11/2003 | Bernett et al. | |
| 6,650,961 B2 | 11/2003 | Deckers | |
| 6,673,460 B2 | 1/2004 | Imai et al. | |
| 6,678,112 B1 | 1/2004 | Kaneko | |
| 6,693,767 B1 | 2/2004 | Butler | |
| 6,762,909 B2 | 7/2004 | Albrecht et al. | |
| 6,765,751 B2 | 7/2004 | Huang et al. | |
| 6,785,082 B2 | 8/2004 | Fiorvanti et al. | |
| 6,831,811 B1 | 12/2004 | Andrikowich et al. | |
| 6,876,514 B1 | 4/2005 | Little | |
| 6,934,118 B2 | 8/2005 | Hidaka et al. | |
| 6,934,958 B2 | 8/2005 | Lin et al. | |
| 6,940,687 B2 * | 9/2005 | Hong et al. | 360/97.02 |
| 7,054,153 B2 | 5/2006 | Lewis et al. | |
| 7,082,012 B2 | 7/2006 | Macpherson et al. | |
| 7,119,984 B2 * | 10/2006 | Macleod et al. | 360/99.18 |
| 7,130,149 B2 * | 10/2006 | Hong et al. | 360/97.18 |
| 7,206,164 B2 | 4/2007 | Hofland et al. | |
| 7,218,473 B2 | 5/2007 | Bernett et al. | |
| 7,239,593 B2 | 7/2007 | Abe | |
| 7,274,534 B1 | 9/2007 | Choy et al. | |
| 7,285,318 B2 | 10/2007 | Kaku et al. | |
| 7,295,399 B2 | 11/2007 | Konno et al. | |
| 7,300,500 B2 * | 11/2007 | Okada et al. | 96/153 |
| 7,301,776 B1 | 11/2007 | Wang et al. | |
| 7,315,447 B2 | 1/2008 | Inoue et al. | |
| 7,330,334 B2 * | 2/2008 | Shimizu et al. | 360/97.14 |
| 7,362,541 B2 | 4/2008 | Bernett et al. | |
| 7,414,813 B2 | 8/2008 | Huynh | |
| 7,420,771 B1 | 9/2008 | Hanke et al. | |
| 7,484,291 B1 | 2/2009 | Ostrander et al. | |
| 7,508,622 B2 | 3/2009 | Martin et al. | |
| 7,525,758 B2 | 4/2009 | Abe | |
| 7,616,400 B2 | 11/2009 | Byun et al. | |
| 7,630,169 B2 | 12/2009 | Murakami | |
| 7,684,146 B1 | 3/2010 | Andrikowich et al. | |
| 7,813,129 B2 | 10/2010 | Van Der Werff | |
| 7,821,735 B1 | 10/2010 | Bogacz et al. | |
| 8,014,167 B2 | 9/2011 | Gunderson et al. | |
| 8,018,687 B1 | 9/2011 | Little et al. | |
| 8,098,454 B2 | 1/2012 | Kouno et al. | |
| 8,194,348 B2 | 6/2012 | Jacoby et al. | |
| 8,248,777 B2 | 8/2012 | Prest | |
| 8,274,755 B2 | 9/2012 | Ishima et al. | |
| 8,427,787 B2 | 4/2013 | McGuire | |
| 8,451,559 B1 | 5/2013 | Berding et al. | |
| 8,533,934 B2 | 9/2013 | McGuire, Jr. et al. | |
| 8,593,760 B2 | 11/2013 | McGuire, Jr. | |
| 8,599,514 B2 | 12/2013 | McGuire, Jr. | |
| 8,859,913 B2 | 10/2014 | Judy | |
| 9,190,115 B2 | 11/2015 | McGuire, Jr. et al. | |
| 2001/0042301 A1 | 11/2001 | Khuu | |
| 2002/0149885 A1 | 10/2002 | Dague et al. | |
| 2002/0196580 A1 | 12/2002 | Tsukahara et al. | |
| 2003/0081347 A1 | 5/2003 | Neal et al. | |
| 2003/0081349 A1 | 5/2003 | Bernett | |
| 2003/0089417 A1 | 5/2003 | Bernett | |
| 2003/0179488 A1 | 9/2003 | Kant et al. | |
| 2003/0179489 A1 | 9/2003 | Bernett et al. | |
| 2003/0223148 A1 | 12/2003 | Macleod et al. | |
| 2004/0070867 A1 | 4/2004 | Kudo et al. | |
| 2004/0134825 A1 | 7/2004 | Navickas | |
| 2004/0150909 A1 | 8/2004 | Kimura | |
| 2004/0169956 A1 | 9/2004 | Oba et al. | |
| 2004/0184184 A1 | 9/2004 | Komatsu et al. | |
| 2004/0207980 A1 | 10/2004 | Kobayashi | |
| 2005/0013039 A1 | 1/2005 | Matsumura et al. | |
| 2005/0041334 A1 * | 2/2005 | Kim et al. | 360/97.02 |
| 2005/0057849 A1 | 3/2005 | Twogood et al. | |
| 2005/0094312 A1 | 5/2005 | Sato | |
| 2005/0130457 A1 | 6/2005 | Nozaki et al. | |
| 2005/0237708 A1 | 10/2005 | Chen | |
| 2006/0050429 A1 | 3/2006 | Gunderson et al. | |
| 2006/0139873 A1 | 6/2006 | Tomizawa et al. | |
| 2006/0176610 A1 | 8/2006 | Tsuda et al. | |
| 2007/0002489 A1 | 1/2007 | Abe | |
| 2007/0034406 A1 | 2/2007 | Schroader | |
| 2007/0171567 A1 * | 7/2007 | Choi et al. | 360/97.02 |
| 2008/0084631 A1 * | 4/2008 | Chan et al. | 360/97.02 |
| 2008/0088969 A1 | 4/2008 | Uefune et al. | |
| 2008/0174910 A1 * | 7/2008 | Hirono et al. | 360/97.02 |
| 2008/0212237 A1 | 9/2008 | Uefune et al. | |
| 2008/0226534 A1 * | 9/2008 | Gidumal et al. | 423/416 |
| 2009/0073327 A1 * | 3/2009 | Gunderson et al. | 349/1 |
| 2009/0073842 A1 | 3/2009 | Kim | |
| 2009/0116141 A1 * | 5/2009 | Brown | 360/97.02 |
| 2009/0183475 A1 | 7/2009 | Dauber et al. | |
| 2009/0256244 A1 | 10/2009 | Liao et al. | |
| 2011/0122567 A1 | 5/2011 | Cheah et al. | |
| 2011/0135949 A1 | 6/2011 | Elia | |
| 2011/0212281 A1 | 9/2011 | Jacoby et al. | |
| 2012/0120562 A1 | 5/2012 | Prest et al. | |
| 2012/0164446 A1 | 6/2012 | Nakahira et al. | |
| 2012/0275052 A1 | 11/2012 | McGuire | |
| 2012/0275054 A1 | 11/2012 | McGuire | |
| 2012/0275055 A1 | 11/2012 | McGuire | |
| 2012/0275056 A1 | 11/2012 | McGuire | |
| 2012/0275057 A1 | 11/2012 | McGuire | |
| 2012/0275105 A1 | 11/2012 | McGuire | |
| 2012/0275106 A1 | 11/2012 | McGuire | |
| 2012/0275285 A1 | 11/2012 | McGuire | |
| 2012/0275286 A1 | 11/2012 | McGuire | |
| 2012/0275287 A1 | 11/2012 | McGuire | |

(56) References Cited

U.S. PATENT DOCUMENTS

| | | |
|---|---|---|
| 2014/0118927 A1 | 5/2014 | Hamburgen |
| 2015/0069056 A1 | 3/2015 | Kishimoto et al. |

FOREIGN PATENT DOCUMENTS

| | | |
|---|---|---|
| JP | 6-218799 | 8/1994 |
| JP | 08-045256 | 2/1996 |
| JP | 10-055662 | 2/1998 |
| JP | 2000-215642 | 8/2000 |
| JP | 2011-240934 | 12/2011 |
| WO | WO 2005/117018 | 12/2005 |
| WO | WO-2015/164551 | 10/2015 |

OTHER PUBLICATIONS

"Laser Welding of Plastics (Knowledge Summary)," http://www.twi.co.uk/content/ksab002.html (Dec. 31, 2009).

"Nd:YAG laser," http://en.wikipedia.org/wiki/Nd:YAG_laser (Feb. 14, 2011).

Jones, Ian, "Clearweld (Knowledge Summary)," http://www.twi.co.uk/content/ksiaj001.html (Dec. 31, 2010).

Venkat, Sri et al., "Sealing Plastic Seams With Laser Welding," www.devicelink.com/mddi (May 31, 2008).

Warwick, Marcus et al., "Application Studies Using Through-Transmission Laser Welding of Polymers," http://www.twi.co.uk/content/spcmwapr2006.html (Apr. 25, 2006).

* cited by examiner

HERMETIC HARD DISK DRIVES COMPRISING INTEGRALLY MOLDED FILTERS AND RELATED METHODS

BACKGROUND OF THE INVENTION

The present invention relates generally to hermetic hard disk drives comprising integrally molded filters and related methods.

A disk drive is a device used to store information in a computing environment. In a disk drive, data is generally recorded on planar, round, rotating surfaces (which are commonly referred to as disks, discs, or platters). There are several types of disk drives, including optical disk drives, floppy disk drives, and hard disk drives. Nowadays, hard disk drives tend to be most common. Strictly speaking, "drive" refers to a device distinct from its medium, such as a tape drive and its tape, or a floppy disk drive and its floppy disk. A hard disk drive (sometimes referred to as a HDD), also referred to as a hard drive, hard disk, or fixed disk drive, is a non-volatile storage device that stores digitally encoded data on rapidly rotating platters with magnetic surfaces. Early hard disk drives had removable media; however, a HDD today is typically an encased unit with fixed media.

A typical hard disk drive includes a head disk assembly (HDA) and a printed circuit board assembly (PCBA) attached to a disk drive base of the HDA. The HDA typically includes at least one magnetic disk, a spindle motor for rotating the disk, and a head stack assembly (HSA) having an actuator assembly with at least one transducer head, typically several, for reading and writing data from the disk. The PCBA includes a servo control system in the form of a disk controller for generating servo control signals. The HSA is controllably positioned in response to the generated servo control signals from the disk controller. In so doing, the attached heads are moved relative to tracks disposed upon the disk. The heads are typically distanced from the magnetic disk by a gaseous cushion—so that they are said to "fly" over the disk. Thus, it is important that the position of the heads be well-controlled for proper reading and writing from the disk.

Hard disk drives are generally sealed to prevent dust and other external sources of contamination from interfering with operation of the hard disk heads therein. Some hard disk drives are hermetically sealed (i.e., they are "hermetic hard disk drives"). A hermetic seal is generally understood to be an airtight seal. Note that some seals (e.g., those "sealing" air within the hard disk drive) are not literally air tight, but rather utilize an extremely fine air filter in conjunction with air circulation inside the hard drive enclosure. The spinning of the disks causes air to circulate therein, forcing any particulates to become trapped on the filter. The same air currents also act as a gas bearing, which enables the heads to float on a cushion of air above the surfaces of the disks. However, "hermetically" sealed means that the seal is so airtight that the disk drive's internal pressure is substantially independent of the external or ambient pressure. This is in contrast to a conventional or non-hermetically sealed disk drive that has a breather port with a filter in a wall of the base plate or cover for equalizing the disk drive's internal pressure with the external pressure. Thus, a hermetically sealed drive does not contain a breather port.

Hermetic hard disk drives are first filled with a desired gaseous medium (whether it be atmospheric air or one or more other gases) before operation. Within a hermetically sealed hard disk drive, gases other than atmospheric air are often employed. Filling the sealed environment of a hard disk drive with gases other than air can enhance their performance. For example, use of lower density inert gases, such as helium, can reduce aerodynamic drag between the disks and their associated read/write heads by a factor of approximately five-to-one as compared to their operation in air. This reduced drag beneficially results in reduced power requirements for the spindle motor. A helium-filled drive, thus, uses substantially less power than a comparable hard disk drive operating in an air environment. At the same time, the helium gas also conducts heat generated during operation of the disk drive away more effectively than air.

Hermetic sealing generally aims to protect a hard disk drive from problems arising based on events and/or materials external to a disk drive. However, other problems may arise based on events and/or materials internal to a disk drive. That is, design of components within conventional disk drives can contribute to hard disk drive failure. For example, plastic components are susceptible to outgassing and components made from conductive materials are prone to shedding of particles, both of which can cause catastrophic disk failure.

Therefore, particulate filters have been incorporated within hard disk drives to help entrap problematic particles and prevent hard disk failure. A common approach to incorporation of such filters in hard disk drives is adherence of a filter to the interior surface of a hard disk drive cover using an adhesive. For example, such filters are described in U.S. Pat. No. 7,630,169 and are commercially available from Donaldson Company, Inc. (Minneapolis, Minn.), including Adsorbent Label Filter (ALF) and an Adsorbent Pouch Filter (APF) forms. Nevertheless, alternatives to use of adhesives for such applications are desired.

In view of the number of potential problems impacting effective and long-term performance of hard disk drives, alternative methods and apparatus for improved hard disk drives are desired. Most desired are those methods and apparatus with improved efficiency and reliability over conventional attempts to provide the same.

SUMMARY OF THE INVENTION

A hermetic hard disk drive of the invention comprises: a housing comprising a base and a cover, wherein at least one of the base and the cover comprises a moldable material; at least one disk for storage of data within the housing; an actuator for reading and recording of the data on the at least one disk; and a filter comprising an integrally molded filter frame within the moldable material of the housing of the hard disk drive.

In one embodiment, the filter, via its filter frame, is integrally molded within the base. In another embodiment, the filter, via its filter frame, is integrally molded within the cover. The base and the cover comprise any suitable materials. In an exemplary embodiment, the base comprises plastic. In another exemplary embodiment, the cover comprises plastic.

The filter comprises any suitable material and configuration. An exemplary filter comprises an adsorbent filter. In one embodiment, the filter comprises activated carbon. In another embodiment, the filter comprises silica gel. An exemplary filter comprises woven, cloth-based activated carbon media. According to further embodiments, the filter comprises a permeable membrane sealing a filter insert within the filter frame.

Dimensions and positioning of the filter frame vary. In one embodiment, at least one side of the filter frame extending toward an interior of the housing is contiguous with a side of the housing. According to a further embodiment, two sides of the filter frame extending toward an interior of the housing are contiguous with adjacent sides of the housing. In an alternate embodiment, each side of the filter frame extending toward an interior of the housing is detached from sides of the housing.

A method of forming a hermetic hard disk drive of the invention comprises steps of: molding the filter frame within the moldable material of the housing of the hard disk drive (e.g., using injection molding); inserting a filter insert within the filter frame; assembling the housing around internal components comprising the at least one disk, the actuator, and the filter; and hermetically sealing the hard disk drive. According to a further embodiment, the method further comprises the step of sealing the filter insert within the filter frame using a permeable membrane to form the filter. In an exemplary embodiment, the permeable membrane is heat staked over the filter insert enclosed within the filter frame.

BRIEF DESCRIPTION OF THE DRAWINGS

Note that the components and features illustrated in all figures throughout this application are not necessarily drawn to scale and are understood to be variable in relative size and placement. Similarly, orientation of many of the components and features within the figures can vary such that, for example, a horizontal configuration could be readily reoriented to a vertical configuration, and vice versa, as desired.

FIG. 2A-1 is a detailed view of the filter frame of FIG. 2A, illustrating dimensions thereof.

DETAILED DESCRIPTION OF THE PREFERRED EMBODIMENTS OF THE INVENTION

The present invention is beneficially applied in conjunction with any suitable conventional hermetic hard disk drive in need of performance improvements. According to the invention, a filter is integrally molded within a hard disk drive housing. Filters of the invention have both an entrance and an exit on the interior of the hard disk drive housing. As such, a path (e.g., of air flow) through the filter is wholly contained with the hermetic hard disk drive.

A disk drive assembly conventionally includes a base to which various components of the disk drive are mounted. A top cover cooperates with the base to form a housing that defines an encased environment for the disk drive. Any disk drive comprises any of a number of suitable components encased within the housing. The components within the disk drive include, for example, a spindle motor, which rotates one or more magnetic disks at a constant high speed, and an actuator assembly for writing information to and reading information from circular tracks on the disks. The actuator assembly typically includes a plurality of actuator arms extending towards the disks, with one or more flexures extending from each of the actuator arms. Mounted at the distal end of each of the flexures is a read/write head, which includes an air bearing slider enabling the head to fly in close proximity above the corresponding surface of the associated disk during operation of the disk drive. When the disk drive is powered down, the heads may be moved to a landing zone at an innermost region of the disks where the air bearing sliders are allowed to land on the disk surface as the disks stop rotating. Alternatively, the actuator assembly may move (unload) the heads beyond the outer circumference of the disks so that the heads are supported away from the disk surface by a load/unload ramp when the drive is powered down.

Figure 1:
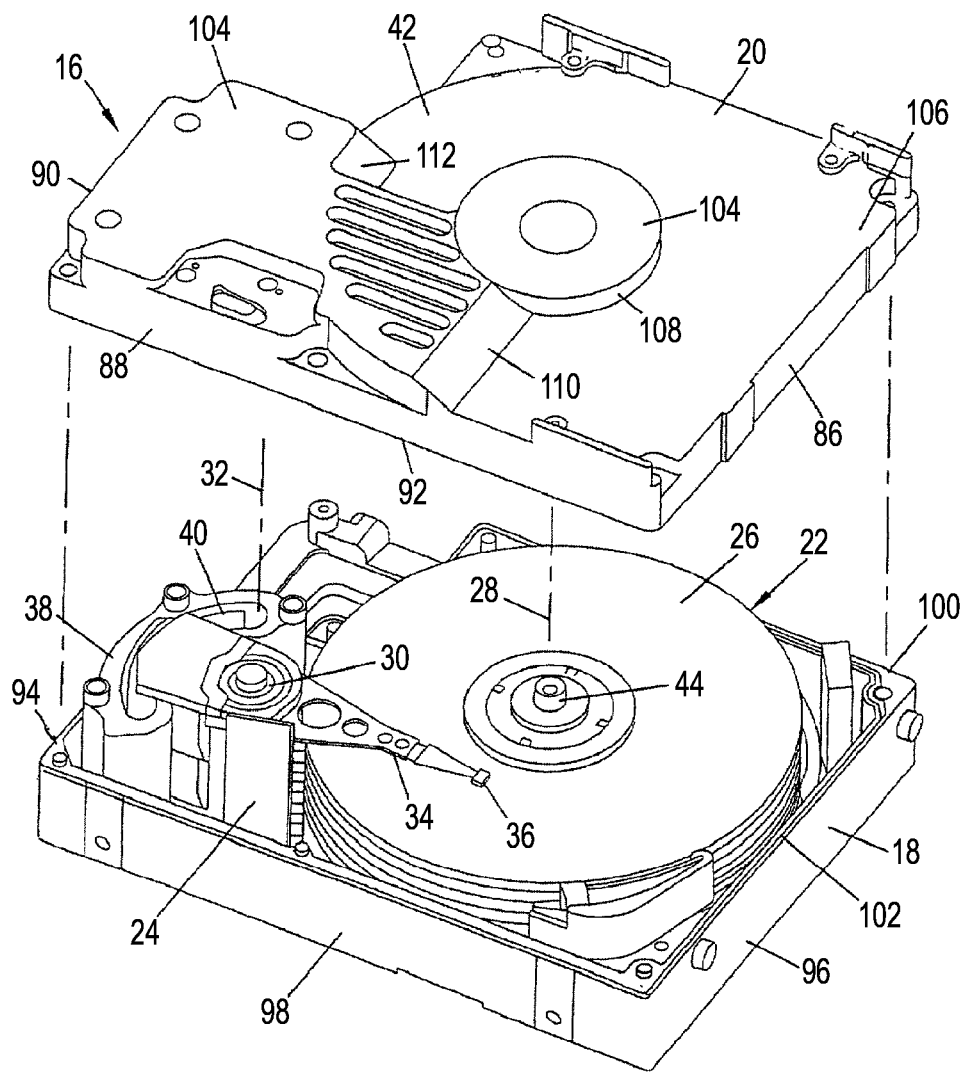
FIG. 1 is a partial perspective view of a prior art hard disk drive with the top cover of the drive housing removed to illustrate certain features.

Turning now to the drawings, there is shown in FIG. 1 part of a prior art hard disk drive 16 described in U.S. Patent Publication No. 2003/0223148. The prior art hard disk drive 16 illustrated in FIG. 1 is only one example of many well-known embodiments of hard disk drives and is illustrated to show exemplary components of hard disk drives for use as a reference in conjunction with a description of the present invention. Recognize, however, that many conventional hard disk drives can be modified according to the improvements of the invention.

As shown in FIG. 1, a conventional hard disk drive 16 has a rigid outer housing including a base 18 and a cover 20. In FIG. 1, the cover 20 is removed from the base 18 to reveal a disk pack or spindle assembly 22 and a rotary actuator 24, both of which are mounted moveably with respect to the housing formed by the base 18 and cover 20. More particularly, the spindle assembly 22 includes a top disk 26 and several additional concentrically stacked and spaced-apart disks rotatable about a vertical spindle axis 28.

Rotary actuator 24 includes an actuator shaft 30 mounted to pivot relative to the base 18 about a vertical actuator axis 32. Several transducer support arms, including a top support arm 34, are fixed to rotate with the actuator shaft 30. Each arm carries a magnetic data transducing head—e.g., a transducing head 36 on a support arm 34. The rotary actuator 24 pivots to move the transducing head 36 along arcuate paths generally radially with respect to the disks. Selective actuator 24 pivoting, in combination with controlled rotation of the disks, allows reading and recording of data at any desired location at any one of the disk recording surfaces. Rotary actuator 24 is pivoted by selective application of an electrical current to a voice coil 38 supported for arcuate movement within a magnetic field created by a permanent magnet arrangement 40, which includes several magnets and a poll piece (both of which are not illustrated in further detail).

The rotary actuator 24 and spindle assembly 22 are supported between two opposed housing walls, including a top wall 42 of the cover 20 and a bottom wall of the base 18. Spindle shaft 44 and the actuator shaft 30 may be stationary—meaning that they are integral with the housing—with the disks and support arms being mounted to rotate relative to their respective shafts.

The cover 20 includes a vertical continuous sidewall structure including a rearward wall 86, a sidewall 88, and a forward wall 90. Here, the upper sidewall structure includes a generally flat, horizontal continuous bottom edge 92, though some embodiments may include a flange or other mated fitting so as to fit into a top edge 100 of base 18 facilitating a tight fit and/or laser-welding. The base 18 includes an upright wall structure including a forward wall 94, a rearward wall 96, and two opposed sidewalls, one of which is shown at 98. These walls combine to form a continuous, horizontal top edge 100. FIG. 1 also illustrates an elastomeric gasket seal 102 mounted to top edge 100 of the base 18. When the cover 20 is assembled onto the base 18, the confronting bottom edge 92 of the cover 20 and the top edge 100 of the base 18 are brought into sealing engagement to close the housing about the spindle assembly 22 and the rotary actuator 24.

The upper and lower sidewalls 88, 98 are generally relatively thick to lend rigidity to the housing. The top wall 42 of the cover 20 may be formed with a horizontal full height region 104 and a horizontal recessed region 106, the two types of regions being interconnected by several non-horizontal regions as indicated at 108, 110 and 112. One portion of the full height region 104 accommodates the rotary actuator 24 and the spindle assembly 22. The non-horizontal regions 108, 110, 112 provide additional stiffness to the top wall 42 of the cover 20, which strengthens the top wall 42 and enables a somewhat reduced thickness wall construction.

Generally, a hard disk drive housing comprises at least two components (e.g., a base and cover). Integrally molded within at least one of the two components is a frame for a particulate or other type of filter. In one embodiment, the filter frame is integrally molded within a base of the hard disk drive housing. In another embodiment, the filter frame is integrally molded within a cover of the hard disk drive housing. While one filter is generally described herein, recognize that more than one filter, integrally molded or otherwise, may be present in hermetic hard disk drives of the invention.

Filters of the invention comprise any suitable material and configuration as known to those of ordinary skill in the art. Materials and configuration for the filter may vary depending on desired function of the filter. For example, the filter may function to control humidity within the hard disk drive. As a further example, the filter may function to control outgassing and other particulation arising from organic materials and metal components within the hard disk drive. Exemplary filters are adsorbent filters. As an example, an exemplary filter according to the invention comprises one or more of an activated carbon filter (including those that are chemically treated) and silica gel. An exemplary activated carbon filter comprises woven, cloth-based carbon media.

Forming the filter as such is advantageous in that adhesive conventionally used to adhere filters to an interior surface of the hard disk drive housing (e.g., cover) can be eliminated. Further, space is efficiently utilized according to the configuration of the invention.

The filter is integrally molded within the hard disk drive housing any suitable methodology. Methods for integrally molding the filter within the hard disk drive housing vary depending on, for example, the material from which the hard disk drive housing is fabricated. Generally, the portion of the housing within which the filter is integrally molded comprises a moldable material. An exemplary moldable material is plastic. It is to be understood that a plastic is any of a group of synthetic or natural organic materials that may be shaped when soft and then hardened, including many types of resins, resinoids, polymers, cellulose derivatives, casein materials, and proteins. Use of plastic affords many advantages. For example, use of such materials facilitates lighter weight hard disk drives and associated cost savings. As a further example, use of moldable materials, facilitates design flexibility in that many performance-enhancing features, in addition to filters of the invention, can be implemented by direct molding of the features or parts thereof within components of the housing (e.g., during injection- or other molding of the housing component).

Figure 2A:
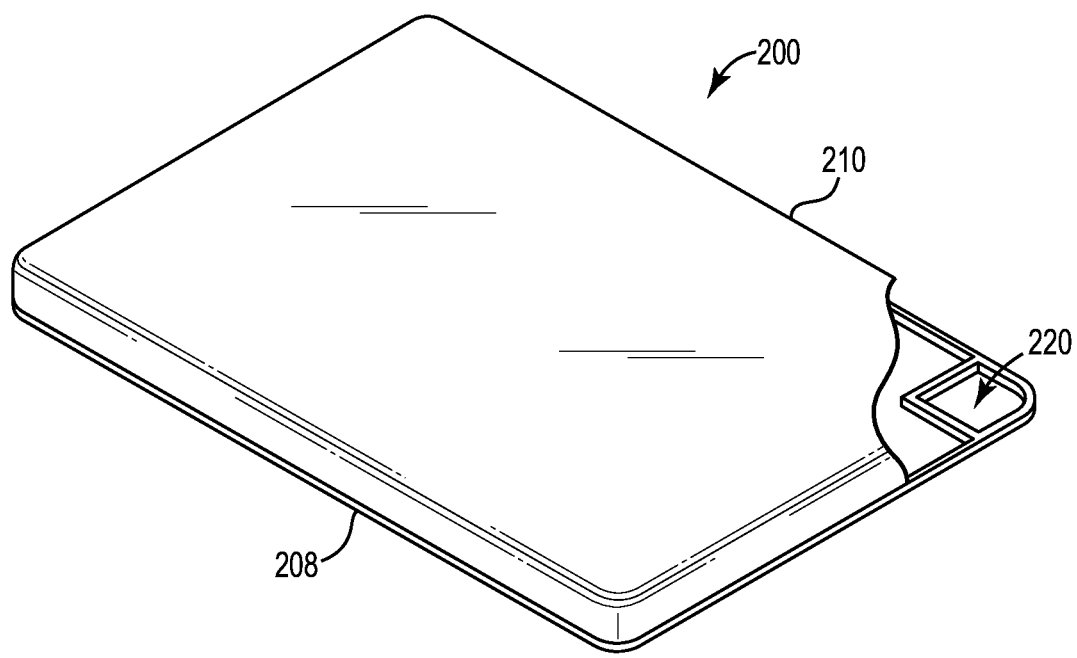
FIG. 2A is a partial perspective view of components of a hard disk drive housing comprising an integrally molded filter frame according to the invention.
Figures 1, 2A:
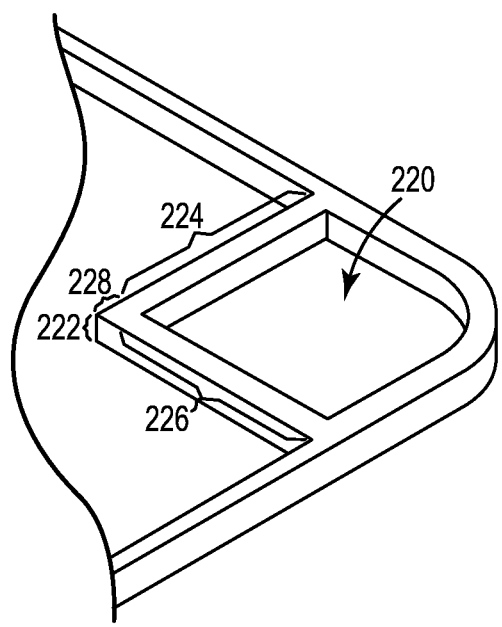

For example, as illustrated in FIG. 2A, a filter frame 220 can be integrally molded within a base 208 of a hard disk drive housing 200 comprising base 208 and cover 210 components. Suitable molding techniques are known to those of ordinary skill in the art. Dimensions of the filter frame 220 can vary according to knowledge within those of ordinary skill in the art and based on competing dimensions within the hard disk drive. Height 222, interior length 224, interior width 226, and thickness 228 of the filter frame 220, as illustrated in FIG. 2A-1 are modified accordingly. In an alternate embodiment, as illustrated in FIG. 2D, the filter frame 220 is integrally molded within the cover 210 of the hard disk drive housing.

Figure 2B:
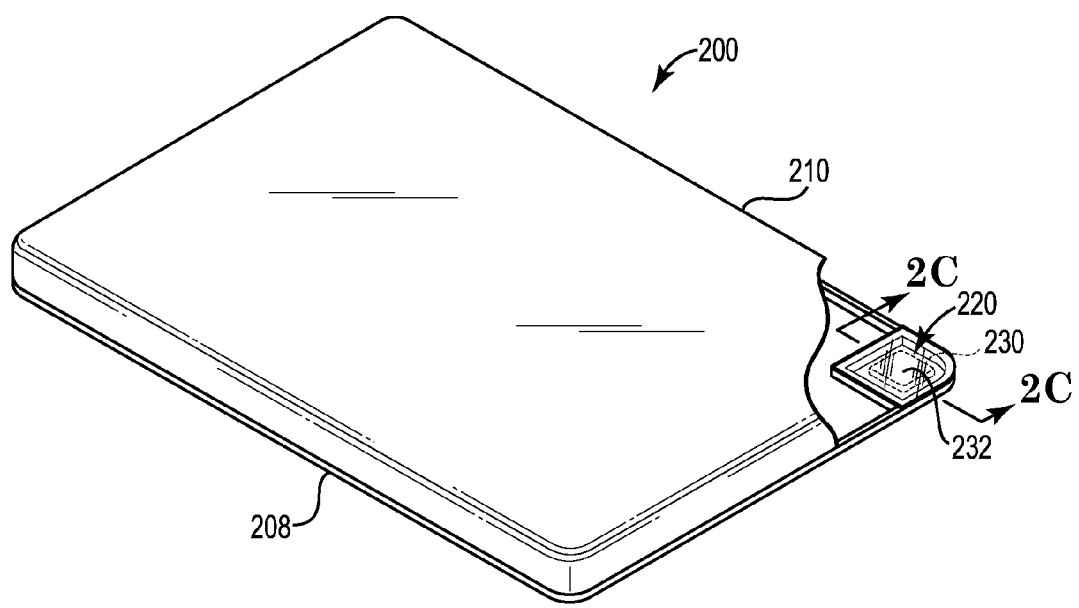
FIG. 2B is a partial phantom top perspective view of the assembled hard disk drive housing of FIG. 2A, comprising an integrally molded filter on the base thereof.
Figure 2C:
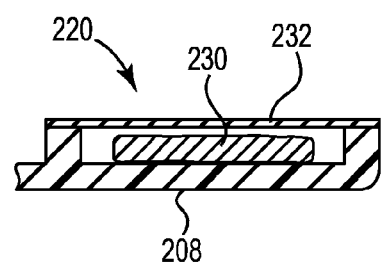
FIG. 2C is a cross-sectional view of the filter illustrated in FIG. 2B.

Before assembly of the hard disk drive and after the base 208 is so molded, a filter insert 230 is positioned within the filter frame 220, as illustrated in FIG. 2B. According to a further embodiment, the filter insert 230 is then sealed within the filter frame 220 using a permeable membrane 232 (e.g., by heat staking the membrane 232 over the filter insert 230 enclosed within the filter frame 220) before assembly of the hard disk drive housing 200.

Figure 2D:
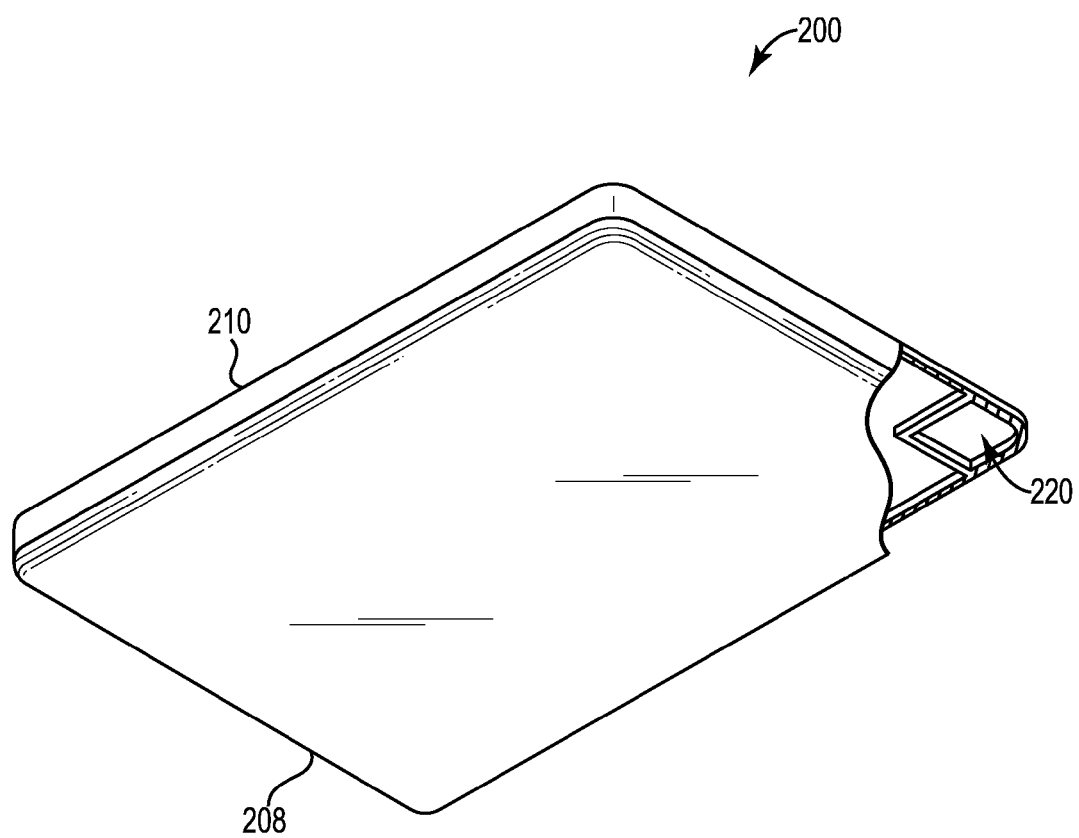
FIG. 2D is a partial perspective view of an alternate embodiment of components of a hard disk drive housing illustrated in FIG. 2A.
Figure 2E:
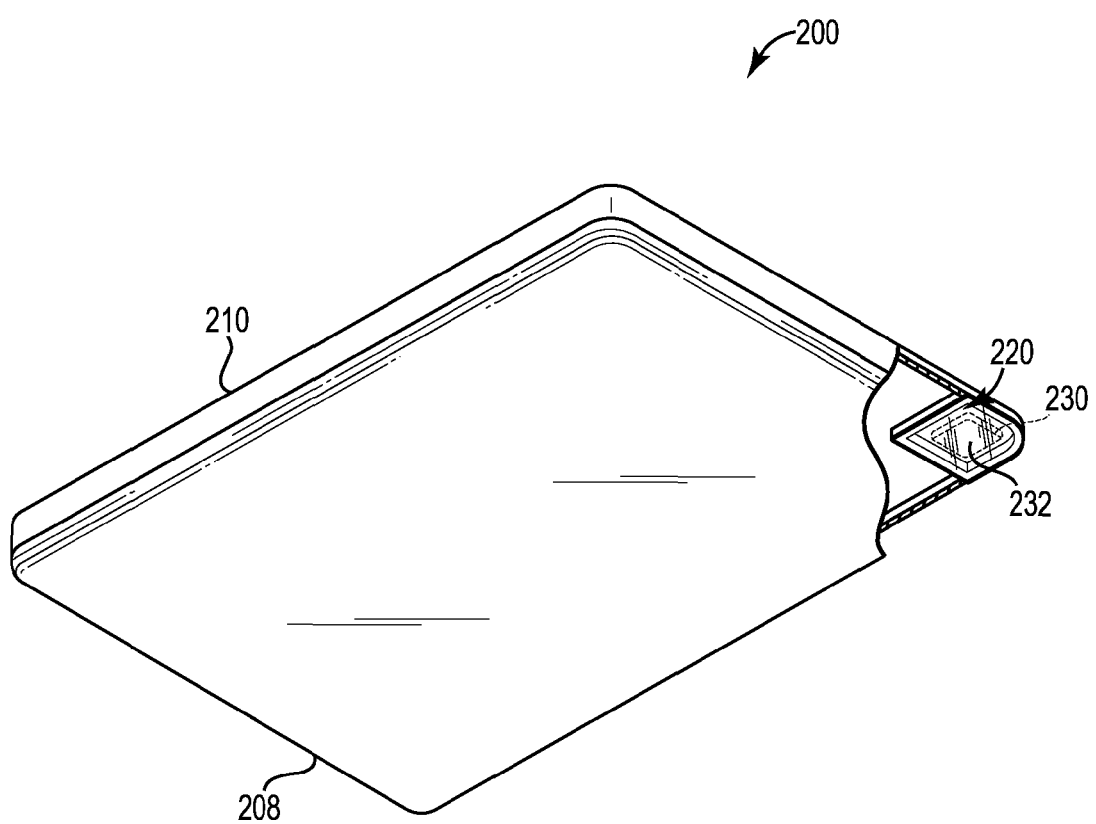
FIG. 2E is a partial phantom top perspective view of the assembled hard disk drive housing of FIG. 2D, comprising an integrally molded filter on the cover thereof.

In an alternate embodiment, as illustrated in FIG. 2D, the filter frame 220 is integrally molded within the cover 210 of the hard disk drive housing. Before assembly of the hard disk drive and after the cover 210 is so molded, a filter insert 230 is positioned within the filter frame 220 and sealed using a permeable membrane 232, as illustrated in FIG. 2E.

Figure 2F:
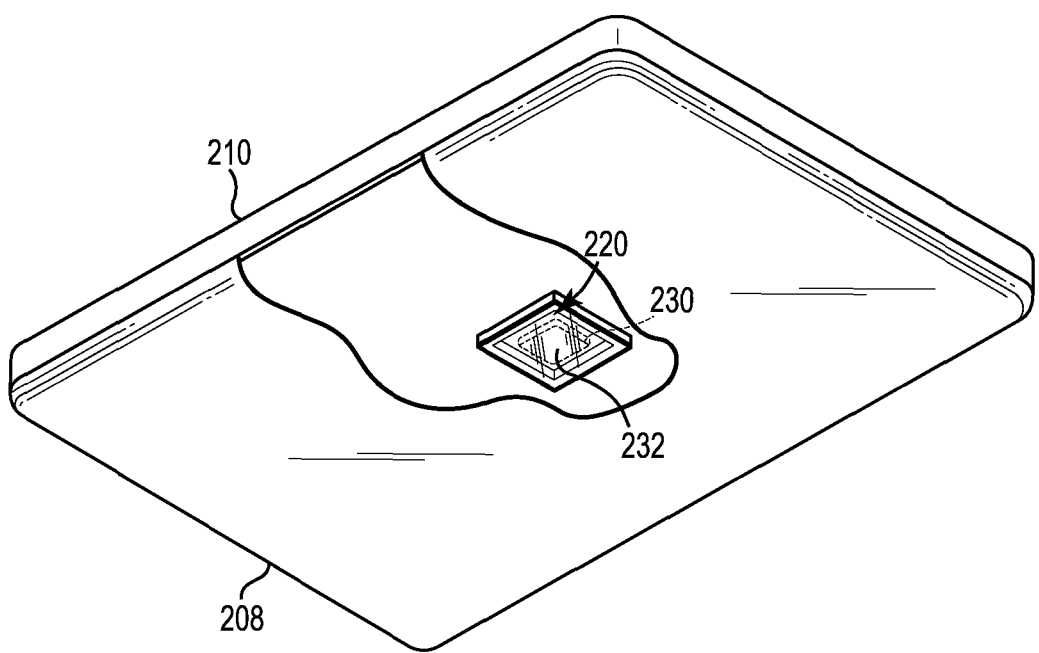
FIG. 2F is a partial phantom top perspective view of an alternate embodiment of the assembled hard disk drive housing of FIG. 2E.

While FIGS. 2A-2B and 2D-2E illustrate formation of the filter frame 220 so that at least one of its sides extending toward an interior of the housing is contiguous with a side of the housing component 208, 210 in which it is formed, recognize that placement of the filter frame 220 need not be limited as such. For example, as illustrated in FIG. 2F, the filter frame 220 is formed such that each side of the filter 240 extending toward an interior of the housing is detached from (i.e., not contiguous with) sides of the housing components 208, 210. Wherever there is sufficient unoccupied space on an interior surface of the hard disk drive housing, an integrally molded filter 240 according to the invention can be positioned.

Any suitable mechanism can be used to mechanically couple the components 208, 210 of the hard disk drive housing 200 around internal components of the hard disk drive to form an enclosed hard disk drive. The filter 240 so formed and an air path therethrough are wholly contained within the hard disk drive to support hermetic sealing of the hard disk drive.

Any suitable methods and apparatus for hermetically sealing the hard disk drive can be used as known to those of ordinary skill in the art. Within the hermetically sealed environment of exemplary hard disk drives of the invention, a gas having a density less than that of atmospheric air can be effectively employed. For example, a gaseous medium comprising at least one of nitrogen, helium, or other noble gases can be employed therein, alone or in combination with one or more of each other and/or air. In an exemplary embodiment, an improved hard disk drive of the invention is capable of providing and maintaining an adequate sealed environment for at least five years. An adequate sealed environment is one in which hard disk drive performance is not significantly affected due to leakage. According to one embodiment, at least about 90% by volume, preferably at least about 95% by volume, of a gaseous medium originally contained within a hard disk drive remains after five years. Any suitable methodology can be used to detect leakage of a gaseous medium from a hard disk drive and amounts thereof.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. Further, while the present invention has been described with respect to a hard disk drive, it should be understood that the present invention also finds utility in other data storage devices—e.g., optical and magneto-optical storage devices.

The invention claimed is:

1. A hermetic hard disk drive, comprising:
   a housing comprising a base and a cover, wherein at least one of the base and the cover comprises a plastic moldable material;
   at least one disk for storage of data within the housing;
   an actuator for reading and recording of the data on the at least one disk; and
   a filter comprising a filter frame integrally molded within and comprising the plastic moldable material and extending toward an interior of the housing of the hard disk drive,
   wherein the hard disk drive is hermetically sealed, and
   wherein only the cover or only the base comprises the filter comprising the integrally molded filter frame.

2. The hard disk drive of claim 1, wherein the base comprises plastic.

3. The hard disk drive of claim 2, wherein the filter frame is integrally formed in the base.

4. The hard disk drive of claim 1, wherein the cover comprises plastic.

5. The hard disk drive of claim 4, wherein the filter frame is integrally formed in the cover.

6. The hard disk drive of claim 1, wherein the filter frame is integrally formed in the base.

7. The hard disk drive of claim 1, wherein the filter frame is integrally formed in the cover.

8. The hard disk drive of claim 1, wherein the filter comprises an adsorbent filter.

9. The hard disk drive of claim 1, wherein the filter comprises activated carbon.

10. The hard disk drive of claim 1, wherein the filter comprises silica gel.

11. The hard disk drive of claim 1, wherein the filter comprises woven, cloth-based activated carbon media.

12. The hard disk drive of claim 1, wherein the filter comprises a permeable membrane sealing a filter insert within the filter frame.

13. The hard disk drive of claim 1, wherein each side of the filter frame extending toward an interior of the housing is detached from sides of the housing.

14. A method of forming the hermetic hard disk drive of claim 1, the method comprising steps of:
    molding the filter frame within the moldable material of the housing of the hard disk drive;
    inserting a filter insert within the filter frame;
    assembling the housing around internal components comprising the at least one disk, the actuator, and the filter; and
    hermetically sealing the hard disk drive.

15. The method of claim 14, further comprising the step of sealing the filter insert within the filter frame using a permeable membrane to form the filter.

16. The method of claim 15, wherein the permeable membrane is heat staked over the filter insert enclosed within the filter frame.

17. The method of claim 14, wherein the step of molding the filter frame within the moldable material of the housing of the hard disk drive comprises injection molding.

18. The hard disk drive of claim 1, wherein a path of air flow through the filter is wholly contained within the hermetic hard disk drive.

19. The hard disk drive of claim 1, wherein the cover only comprises the filter comprising the integrally molded filter frame.

20. The hard disk drive of claim 1, wherein the base only comprises the filter comprising the integrally molded filter frame.

21. A hermetic hard disk drive, comprising:
    a housing comprising a base and a cover, wherein at least one of the base and the cover comprises a plastic moldable material;
    at least one disk for storage of data within the housing;
    an actuator for reading and recording of the data on the at least one disk; and
    a filter comprising an integrally molded filter frame within the moldable material and extending toward an interior of the housing of the hard disk drive,
    wherein the hard disk drive is hermetically sealed, and
    wherein at least one side of the filter frame extending toward an interior of the housing is contiguous with a side of the housing.

22. A hermetic hard disk drive, comprising:
    a housing comprising a base and a cover, wherein at least one of the base and the cover comprises a plastic moldable material;
    at least one disk for storage of data within the housing;
    an actuator for reading and recording of the data on the at least one disk; and
    a filter comprising an integrally molded filter frame within the moldable material and extending toward an interior of the housing of the hard disk drive,
    wherein the hard disk drive is hermetically sealed, and
    wherein two sides of the filter frame extending toward an interior of the housing are contiguous with adjacent sides of the housing.

* * * * *